United States Patent [19]

Shea

[11] Patent Number: 5,402,969
[45] Date of Patent: Apr. 4, 1995

[54] AIRCRAFT STRUCTURE

[76] Inventor: Brian Shea, 3601 Morningside Dr., El Sobrante, Calif. 94803

[21] Appl. No.: 34,477

[22] Filed: Mar. 9, 1993

[51] Int. Cl.6 .......................... B64C 3/10; B64C 31/02
[52] U.S. Cl. ........................................ 244/36; 244/16; 244/900
[58] Field of Search ................ 244/35 R, 38, 36, 900, 244/902, 16

[56] References Cited

U.S. PATENT DOCUMENTS

| | | | |
|---|---|---|---|
| 934,771 | 9/1909 | Turnbull | 244/35 R |
| 3,480,238 | 11/1969 | Barish | 244/900 |
| 4,033,070 | 7/1977 | Strongin et al. | |
| 4,195,439 | 4/1980 | Kramer | |
| 4,198,019 | 4/1980 | Linczmajer | 244/900 |
| 4,387,869 | 6/1983 | Englar et al. | |
| 4,655,412 | 4/1987 | Hinkleman | 244/35 R |
| 4,718,619 | 1/1988 | Ashill et al. | |
| 4,941,803 | 7/1990 | Wainauski et al. | 244/35 R |

FOREIGN PATENT DOCUMENTS

| | | | |
|---|---|---|---|
| 0111785 | 6/1984 | European Pat. Off. | 244/35 A |
| 2592360 | 7/1987 | France | 244/900 |
| 63136 | 4/1949 | Netherlands | 244/35 R |
| 1030829 | 5/1966 | United Kingdom | 244/35 R |
| 8102557 | 9/1981 | WIPO | 244/35 R |

Primary Examiner—Michael S. Huppert
Assistant Examiner—Virna Lissi Mojica
Attorney, Agent, or Firm—Bielen, Peterson & Lampe

[57] ABSTRACT

An aircraft structure, such as a glider including a wing having a substantially flat, upper, first surface and a convex, lower, second surface. The wing first and second surfaces converge to a leading edge and a trailing edge. A weighted member is used to determine the center of gravity of the wing as being 15 to 25% of the length of the chord from the leading edge. The weight structure is fixed to the wing and may also serve as a structural member.

13 Claims, 1 Drawing Sheet

AIRCRAFT STRUCTURE

BACKGROUND OF THE INVENTION

The present invention relates to a novel aircraft structure.

Most paper airplanes do not employ a curved or cambered wing. This is believed to be due to the fact that the overall weight of a paper airplane is light relative to the surface area of the wings. Thus, adequate lift is achieved without curvature of the wing. Stability of flight occurs by bending the trailing edge of the wing structure. For example, U.S. Pat. No. 4,195,439 and 4,033,070 describe or show a toy flying object having wings of relatively uniform thickness.

The lifting force of a wing is achieved by air deflection. A wing meets the air flow of an angle of attack and the airflow is caused to change direction. In other words, the mass and velocity of the deflected air equals the lift imparted to the wing, an action-reaction system.

In the case of an unswept and untapered flying wing the angle of attack is established by shaping the airfoil such that the airflow is directed slightly upwardly at the trailing edge. This effect pushes the rear of the wing downwardly keeping the entire wing at a positive angle of attack. Flexing regions at the trailing edge of the wing are employed in this regard.

An aircraft structure which employs a balanced wing design without a flexing region would be notable advance in the aerodynamic field.

SUMMARY OF THE INVENTION

In accordance with the present invention a novel and useful aircraft structure is herein described.

The aircraft structure of the present invention utilizes a substantially rigid wing having a generally flat upper first surface and a convex second lower surface. Such proportions would be viewable in section at generally right angles to the flow of air over the surface of the wing. In other words, the first and second surfaces converge to leading and trailing edges of the wing structure. The wing may be formed of very light material possessing a density less than 2 pounds per cubic foot. For example, foam plastic material may be employed in this regard. In plan view, the wing first surface may be essentially rectangular. In any case, the wing of the present invention possesses an optimal aspect ratio ranging between two and four.

Weighting means is also provided for determining the center of gravity of the wing structure. The center of gravity is fixed by the weighting means to lie between 15 and 25% of the length of the cord from the leading edge of the wing. The cord is generally defined as a straight line joining the leading and trailing edges of a wing. The weighting means is fixed or attached to the wing and may overlap the leading edge of the same. In certain cases, the weighting means may comprise a relatively stiff spar which substantially spans the wing along the leading edge. In certain cases, the weighting means may wrap around the leading edge and include a first portion adjacent the first surface of the wing and a second portion adjacent the second portion of the wing. Thus, the spar may clamp to the wing at the leading edge and even deform the same when the leading edge is overlapped by the weighting means.

It may be apparent that a novel and useful glider structure has been described.

It is therefore an object of the present invention to provide an aircraft structure which utilizes a substantially rigid wing structure of relatively light material which is capable of stable flight.

It is another object of the present invention to provide an aircraft structure having a substantially light and rigid wing in combination with weighting means that provides a center of gravity just aft of the leading edge of the wing.

Another object of the present invention is to provide an aircraft structure which is relatively simple to manufacture in either a toy or pilot carrying glider.

A further object of the present invention is to provide an aircraft structure which may be flown by supplying a pulling force to the leading edge or by gripping the wing tips and flinging the same.

The invention possesses other objects and advantages especially as concerns particular characteristics and features thereof which will become apparent as the specification continues.

For a better understanding of the invention reference is made to the following detailed description of the preferred embodiments thereof which will be referenced to the hereinbefore described drawings.

DESCRIPTION OF THE PREFERRED EMBODIMENTS

Various aspects of the present invention will evolve from the detailed description of the preferred embodiments thereof which should be taken with the drawings prior described.

Figure 2:
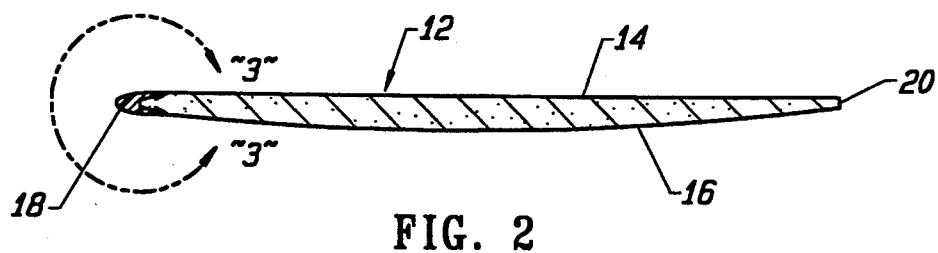
FIG. 2 is a cross-section of the aircraft structure of the present invention taken alone line 2—2 of FIG. 1.
Figure 3:
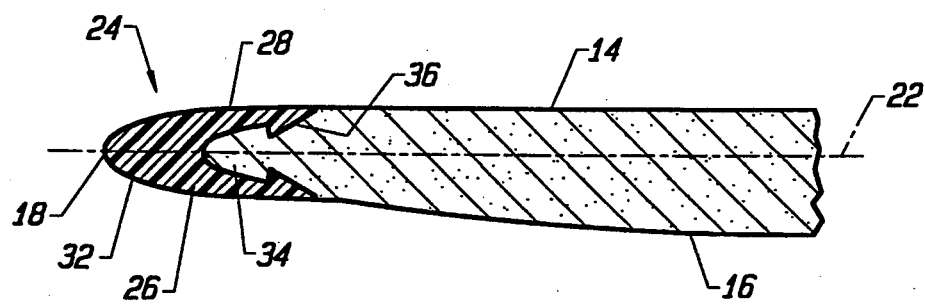
FIG. 3 is an enlarged sectional view of the leading edge of the aircraft structure of the present invention taken along line 3—3 of FIG. 2.

The invention, as a whole is shown in the drawings by reference character 10. The aircraft structure 10, which may be a glider, includes as one of its elements a substantially rigid wing 12. Wing 12 includes a first, upper, flat surface 14 and a second lower convex surface 16. First and second surfaces 14 and 16 converge to leading edge 18 and trailing edge 20, as shown in FIG. 2. Wing 12 may be constructed of relatively light material such as polypropylene foam, polystyrene foam, or a similar material. In general, wing 12 possesses a density of less than 32 kilograms per cubic meter (2 pounds per cubic foot). Turning again to FIG. 1, it may be observed that wing 12 is generally rectangular in configuration when viewed upon first surface 14. Wing 12 normally possesses an aspect ratio ranging between two and four. That is to say, the ratio span of wing 12 to the mean cord 22 (shown partially in FIG. 3) ranges between two and four. As viewed in FIG. 2, wing 12 would move from right to left when in flight.

Figure 1:
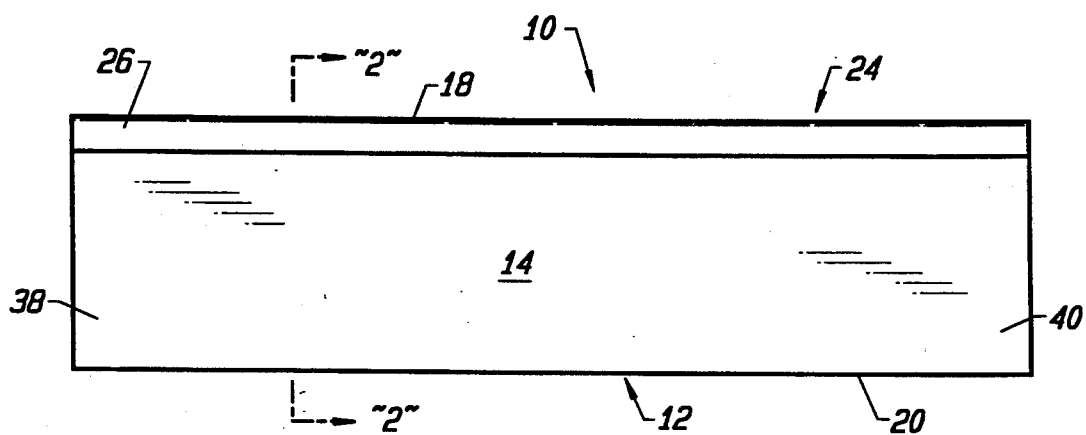
FIG. 1 is a top plan view of the aircraft structure of the present invention.

Aircraft 10 also includes weighting means 24 for determining the center of gravity of wing 12. Such center of gravity lies between 10 to 25% of the length of cord 22 from leading edge 18. Weighting means 24 may take the form of a plastic strip 26 having a first portion 28 overlying first surface 14 and a second portion 30 overlying second surface 16. Other relatively stiff and dense materials may be used for strip 26, such as metal, wood and the like. Plastic strip 26, when flexible, may be clamped in place to leading edge 18 such that outer surface 32, thereof, serves as a continuation of first and second surfaces 14 and 16 of wing 12, FIG. 3. End portion 34 of wing 12 is compressed, depicted in FIG. 3, in this regard. Plastic strip 26 may be attached in other ways such as imbedding the same within wing 12. In addition, mastic or other adhesive material may be interposed the inner surface 36 of plastic strip 26 and end portion 34 of wing 12. As shown in FIG. 1, plastic strip 26 may extend completely along leading edge 18 of glider 10. Since plastic strip 26 is relatively stiff, it serves as a spar which substantially spans wing 12. This function adds strength to glider 10 and protects leading edge 18.

In operation, the user grasps leading edge 18 along plastic strip 26 of aircraft 10, as depicted in FIG. 2 and pulls aircraft 10 from right to left. Aircraft 10 is released at the termination of such pulling action to cause flight. Also, wing tips 38 and 40 of wing 12 may be held such that aircraft 10 is flung in the same direction, as heretofore described. It is also believed, that glider 10 may be employed with a fuselage and scaled upwardly in size where it is capable of transport persons in flight.

While in foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. An aircraft comprising:
   a. a wing having a essentially flat upper first surface and a convex lower second surface, said first and second surfaces converging to a leading edge and trailing edge; and
   b. weighting means for determining the center of gravity of said wing at 10–25 percent of the length of the chord from said leading edge, said weighting means being fixed to said wing.

2. The aircraft of claim 1 in which said weighting means comprises a relatively stiff spar substantially spanning said wing.

3. The aircraft of claim 2 in which said spar includes a first portion and second portion extending in opposition to said first portion, at said flat upper surface and said convex lower surface, respectively.

4. The aircraft of claim 2 in which said first and second portions are connected to form a spar unit extending over the leading edge of the wing.

5. The aircraft of claim 4 in which said wing possesses an aspect ratio ranging between two and four.

6. The aircraft of claim 5 in which said wing first surface is essentially rectangular in plan view.

7. The aircraft of claim 6 in which said spar unit includes a clamp for holding said spar unit to said wing at said leading edge.

8. The aircraft of claim 1 in which said wing possesses a density no greater than 32 kilograms per cubic meter.

9. The aircraft of claim 7 in which said weighting means comprises a relatively stiff spar substantially spanning said wing.

10. The aircraft of claim 8 in which said spar includes a first portion and second portion extending in opposition to said first portion, at said flat upper surface and said convex lower surface, respectively.

11. The aircraft of claim 9 in which said first and second portions are connected to form a spar unit extending over the leading edge of the wing.

12. The aircraft of claim 10 in which said wing possesses an aspect ratio ranging between 2 and 4.

13. The aircraft of claim 11 in which said wing first surface is essentially rectangular in plan view.

* * * * *